US008051147B2

(12) United States Patent (10) Patent No.: US 8,051,147 B2
Ni et al. (45) Date of Patent: Nov. 1, 2011

(54) INTERNET ACCESS SERVER FOR ISOLATING THE INTERNAL NETWORK FROM THE EXTERNAL NETWORK AND A PROCESS METHOD THEREOF

(76) Inventors: Haisheng Ni, Huqiu (CN); Lin Zhu, Huqiu (CN)

( * ) Notice: Subject to any disclaimer, the term of this patent is extended or adjusted under 35 U.S.C. 154(b) by 27 days.

(21) Appl. No.: 12/302,821

(22) PCT Filed: Jan. 11, 2007

(86) PCT No.: PCT/CN2007/000108
§ 371 (c)(1),
(2), (4) Date: May 11, 2009

(87) PCT Pub. No.: WO2007/140671
PCT Pub. Date: Dec. 13, 2007

(65) Prior Publication Data
US 2009/0222535 A1 Sep. 3, 2009

(30) Foreign Application Priority Data
May 30, 2006 (CN) .......................... 2006 1 0027047

(51) Int. Cl.
*G06F 15/16* (2006.01)
(52) U.S. Cl. ..................................................... 709/219
(58) Field of Classification Search ................... 709/219
See application file for complete search history.

(56) References Cited

U.S. PATENT DOCUMENTS

| | | | | |
|---|---|---|---|---|
| 5,872,915 A * | 2/1999 | Dykes et al. ...................... 726/5 |
| 6,920,502 B2 * | 7/2005 | Araujo et al. ................. 709/229 |
| 7,246,174 B2 * | 7/2007 | Sciandra et al. .............. 709/244 |
| 7,631,179 B2 * | 12/2009 | Kuehn et al. .................. 713/151 |
| 7,649,854 B2 * | 1/2010 | Piper ............................. 370/265 |
| 2002/0165945 A1 * | 11/2002 | Buswell et al. ............... 709/221 |
| 2003/0028532 A1 * | 2/2003 | Dougu et al. ...................... 707/9 |
| 2004/0025008 A1 * | 2/2004 | Kuehn et al. .................. 713/151 |
| 2004/0181663 A1 * | 9/2004 | Pienimaki et al. ............ 713/155 |
| 2005/0144297 A1 * | 6/2005 | Dahlstrom et al. ........... 709/229 |
| 2005/0182815 A1 * | 8/2005 | Offredo et al. ................ 709/200 |
| 2005/0267779 A1 * | 12/2005 | Lee et al. ........................... 705/1 |
| 2006/0005247 A1 * | 1/2006 | Zhang et al. ..................... 726/26 |
| 2007/0169144 A1 * | 7/2007 | Chen et al. ....................... 725/30 |
| 2007/0179955 A1 * | 8/2007 | Croft et al. ......................... 707/9 |
| 2007/0180449 A1 * | 8/2007 | Croft et al. ......................... 718/1 |
| 2007/0198656 A1 * | 8/2007 | Mazzaferri et al. ........... 709/218 |
| 2007/0239859 A1 * | 10/2007 | Wilkinson et al. ............ 709/220 |
| 2007/0280211 A1 * | 12/2007 | Malueg et al. ................ 370/356 |
| 2007/0294416 A1 * | 12/2007 | Agre et al. ..................... 709/229 |
| 2008/0091794 A1 * | 4/2008 | Thieringer .................... 709/217 |
| 2009/0222535 A1 * | 9/2009 | Ni et al. ......................... 709/219 |

* cited by examiner

*Primary Examiner* — Jerry Dennison
(74) *Attorney, Agent, or Firm* — Clement Cheng (57) ABSTRACT

A internet access server for isolating the internal network from the external network and a process method thereof, the server is used to isolate the user computer from internet. The computer server universal-based includes a graphics terminal service module, a graphics terminal network transmission module, a internal network transmission control module, a document transmission control module, a system configuration and user management module, and a internet access transmission module. By using the invention, the isolation and security of the internal network and the external network are realized by the special access mode and transmission control. All the authorized computer in the internal network could access the internet via the internet access server which includes a image terminal.

5 Claims, 6 Drawing Sheets

INTERNET ACCESS SERVER FOR ISOLATING THE INTERNAL NETWORK FROM THE EXTERNAL NETWORK AND A PROCESS METHOD THEREOF

TECHNICAL FIELD

The invention herein relates to computer network security technology, in particular applies to a local area network for isolation the internal network from the external network while ensuring a convenient access to the internet, where the internal network is a network containing confidential documents and data, and the external network is a network that is connected to the internet. To be specific, the invention addresses an internet access server and the related processing methods for isolating the internal network from the external network.

BACKGROUND

The most common practice in the existing network structure implemented by companies and agencies is to establish a local area network, which is connected to the external internet through the firewall or NAT (an internal network address translation protocol) so that computers within the internal network can access internet through the firewall, whereas a connection attempt from outside can not succeed prior to going through the firewall's conformance verification.

To track and control the computers within the local area network accessing internet, most enterprises will set up a proxy server. All computers within the local area network can only access internet through it.

Figure 1:
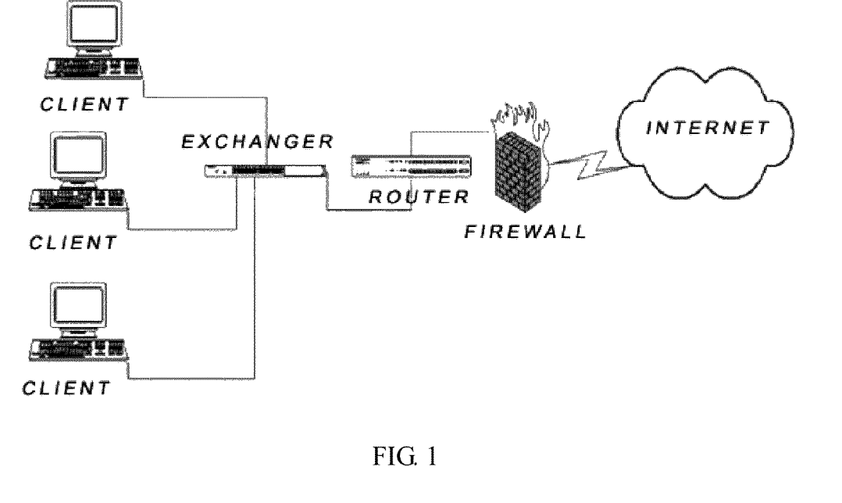
FIG. 1 is a typical scheme of current network topology.

FIG. 1 illustrates a typical topology used for a local area network connected with a wide area network, which includes a local area network composed of a number of computers (1), converter (2) and router (3), firewall (4) and internet (5).

The concept of isolation is developed to protect high-security network environment. Isolation products have experienced continuous integration of theory with practice on five generations of isolation technologies before swarming into market.

1st Generation—Absolute Isolation

This method makes the network an isolated information island by an absolute physical isolation. It requires at least two sets of network and system, on top of which is the inconvenience of information exchange and increased cost, and therefore complicates both operation and maintenance.

2nd Generation—Isolation Card

This method adds a hardware card on client-side. The hard disc and other storage devices on client-side must connect to the card before being connected to the main board. Thereby, the disc and other storage devices on client-side are being controlled. While different discs are chosen, different network interfaces are chosen too to connect to different networks. However, some of the cards still require 2-wire network wiring structure, in which great potential of security danger exists.

3rd Generation—Data Relay

Isolation is achieved by data relay system copying files in a time-sharing manner, which takes a very long time and even needs manual operation. It slows down the access speed, and supports none of the frequently used network applications, leaving network usage senseless.

4th Generation—Air-Gap Switch

The internal and external network access the tentative cache at different times using a single-pole double-throw switch, by which data exchange is achieved. There are many problems with this method in both security and performance.

5th Generation—Security Channel Isolation

With this technology, isolation between the internal and external networks and data exchange is achieved by such security mechanisms as dedicated session hardware and security protocol etc. This method solves the problems with the previous technologies, isolates the internal and external networks effectively, achieves secure data exchange between the internal and external networks efficiently, and supports multiple network applications in a transparent way, therefore leading the development of current isolation technology.

However, security and convenience is believed to be what the 5th generation isolation technology needs to tackle.

The most common approaches to accessing internet include web, mail and FTP etc, which are all flexible and robust. The immense resources on the internet provide great help and convenience to the interaction between our business and the outside world.

Interaction with internet includes both obtaining information from the internet and sharing our own information or uploading it onto the internet for sharing with others. Internet technology provides us hundreds and thousands of means to share or upload our own information, which provides convenience to organizations and agencies, but carries great danger of information leakage.

To technically avoid these dangers, most organizations and agencies implement two methods, i.e. protecting the confidential documents by encryption and isolating the network containing these documents from the internet.

As the first method, protecting the confidential documents by encryption brings inconvenience to users in that it controls the access to these documents by using password and all the documents need passwords, the method of centralized key control is developed. However, here comes another problem. Since the confidential documents are of different types, reading them requires different file readers, which again brings inconvenience for password control.

The second method is also used widely. In many practices, network is divided into two physically, to which two computers are connected respectively. Along with that emerge a large amount of related technologies, among which are physical isolation card and network gap. Physical isolation card requires modification to one computer so as to achieve physical isolation of two hard disks in it and allow for switch between two different networks. Network gap is designed to isolate the internal and external networks, while allowing for necessary transmission between the two networks.

However, both methods incur increased operating cost and inconvenience. Logic means allow for multiple connections to internet, but absolute logic isolation is next to impossible. The invention described herein is intended to get us out of the dilemma.

SUMMARY

The invention is intended to provide a internet access server for isolating the internal network from the external network and a process method thereof. This internet access server not only allows the users to obtain information and data conveniently from the internet, but also systematically controls the transmission of documents from organizations and agencies, thus achieving a convenient and reasonable isolation of the enterprise' internal network from the outside internet.

The internet access server in this invention for isolating the internal network from the external network connects the internal network composed of a number of computers and the internet, based upon a common ontology server and with the following features, It includes a graphics terminal service module, a graphics terminal network transmission module, a internal network transmission control module, a document transmission control module, a system configuration and user management module, and a internet access transmission module, of which, The graphics terminal service module is connected to the graphics terminal network transmission module, providing graphics terminal service to its clients;

The internal network transmission control module which is connected to the above mentioned ontology server strictly controls network session, ensuring the validity of session between the clients within the network and the internet access server;

The document transmission control module which is connected to the ontology server is intended to manage the files and data transmission between any user computer's local disc and the user's private storage space on the internet access server;

The system configuration and user management module which is connected to the ontology server is used to add, delete or modify user setting, upload process design and system parameters setting;

The internet access transmission module which is connected to the ontology server is intended to provide transmission control management for the above mentioned graphics terminal service module to access internet.

The above mentioned internet access server also includes two network interfaces, one for user computers to access internet graphics terminals, and the other for connecting and accessing internet.

In the above mentioned internet access server, the graphics terminal service module herein includes www web explorer, E-mail client terminal and FTP client terminal.

In the above mentioned internet access server, the data transmission controlled by the internal network transmission control module herein between the clients and the internet server has four types of data session, including graphics terminal network protocol, valid download from the server onto its clients, controlled upload from clients onto the internet access server, and control instructions.

In the above mentioned internet access server, the document transmission control module herein is composed of download component and upload component.

The invention also provides a method of registration on client-side in the internet access server herein, which includes the following steps:

Obtain data identification number and user's authorization information by program initialization on client terminal, register the data identification number on the internet access server and get authorization;

As for those registrations having been confirmed and authorized by the internet access server, the internet access server records the registration and announces this registration finished; as for those not confirmed or authorized, the server directly announces registration finished.

The invention also provides a method of filtering data package in the internet access server, which includes the following steps:

After receiving the data package, judge if it has the correct data identification number;

As for those with correct data identification number, obtain K-client terminal and server address from the package, and judge if it has been properly authorized and if the type of data is valid;

If so, transmit the data package to the correct address and announce transmission terminated;

If not, discard the package;

As for those without correct data identification number, discard the data package directly and announce transmission terminated.

The invention also provides a method for users to download data from internet onto client computers in the internet access server, which includes the following steps:

After users download files onto their private storage space via www web explorer at graphics terminal, or E-mail client terminal, or FTP client terminal, the file transfer module provides a list of all the files to the clients in accordance with the list of files on the specific space on the server after the download link initialization, from which users can choose to download;

Having read the target directory the user defines, the transfer module transmits the data to the right local directory that the user has specified in his/her computer on the internal network via authorized data transfer channels.

The invention also provides a method of upload control in the internet access server, which includes the following steps:

When the transmission link is initialized and an authorized user uploads file via FILE, the uploaded file will be saved in the server's security space for screening. The file that passes the screening will be transferred from the security space to the user's personal storage space and the process is announced over; if the file fails the screening, the failure will be recorded and the process over.

Finally, the invention provides an above mentioned internet access server for isolating the internal and external networks with the following features: the internal network transmission control module, graphics terminal service module, document transmission control module, system configuration and user management module, and internet access transmission module herein are set in different ontology servers in predetermined manner.

In this invention, it is through a special internet access and transmission control method that the internal and external networks are isolated for the purpose of security. Any authorized computer within the internal network may access internet via internet access server which can include the common internet tools on client-side (e.g. www, E-mail, FTP etc.) that a graphics terminal has. The files or data downloaded in this way can only be saved in the specific personal storage space in the external network, and then downloaded onto the internal network from the external network server. Files in the internal network are not allowed (or strictly controlled) to be uploaded. Therefore, the invention described herein allows for information inquiry and external contacts while protecting the information contained on the internal network by isolation.

BRIEF DESCRIPTION OF THE DRAWINGS

Through the following description of the case and the attached drawings on the invention implementation, the intention, specific structural characteristics and advantages of the invention can be further understood. The drawings are described as follows.

DETAILED DESCRIPTION OF PREFERRED EMBODIMENT

The guideline in the invention is to access the internet conveniently within an agency, while ensuring the internal network security of the agency by means of isolation and special transmission methods.

Firstly, the invention requires modification to network topology. As shown in FIG. 1: typical topology of current networks, the invention achieves isolation of the internal network composed of a number of user computers (clients) from the internet, so that the clients are unable to access the internet directly or indirectly (i.e. via proxy server etc).

Figure 2:
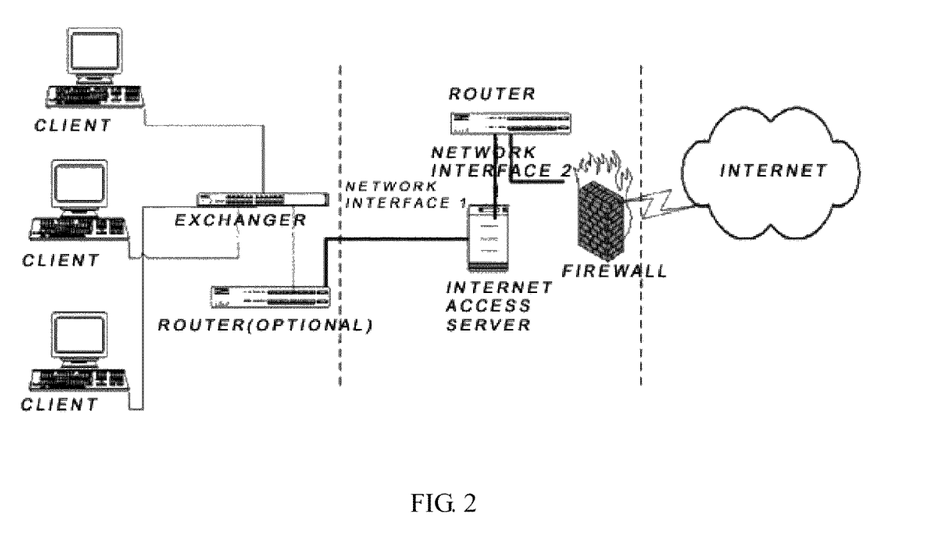
FIG. 2 is a scheme in which the internet access server described in the invention herein is configured into the network topology in FIG. 1.

As shown in FIG. 2, an internet access server (6) is added between the internet (5) and user computer (1), thus isolating the client and the internet. Only the internet access server can actually access internet through router and firewall, whereas the client must get through the graphics terminal on the internet access server before accessing internet.

1) Internet Access Server

Hardware Platform Requirements

Internet access server is built upon common computer server comprising server main board, CPU, memory, display adapter card and network card. The server described herein needs to modify the network components. Two network cards are required: one for clients to access internet graphics terminal, whose IP is directly connected with computers within the internal network; the other for accessing internet, with an IP allowing a direct session with the internet router in the network. Nevertheless in an alternative solution, one network card is used, in which two network configuration settings are imbedded for the operating system, with identical functions respectively as described above. In summary, the server herein has two network interfaces, one for its clients to access internet graphics terminal, and the other for connecting and accessing internet.

It should be noted that the two network interfaces do not provide for routing or data package rerouting functions in the operating system of the server.

Software Design and Implementation

Figure 3:
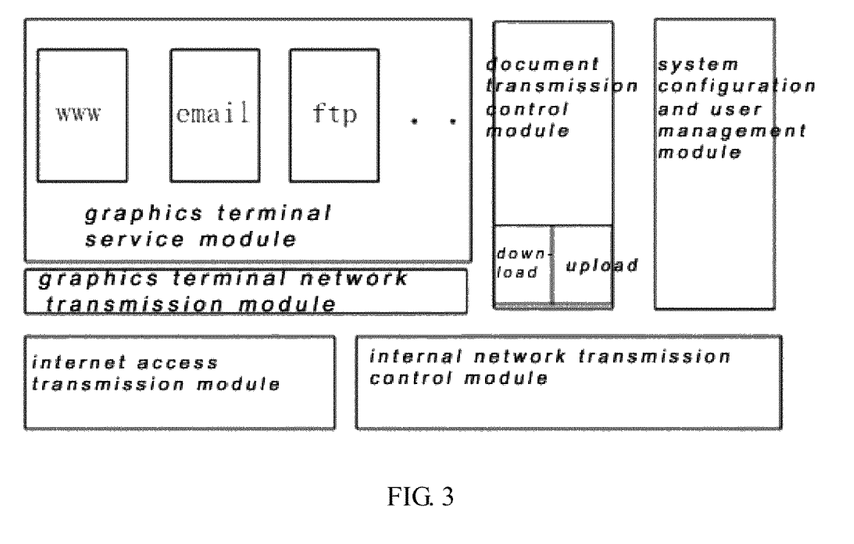
FIG. 3 is the functional modules configuration in the internet access server described in the invention herein.

As shown in FIG. 3, the internet access server includes a graphics terminal service module (61), a graphics terminal network transmission module (62), a internal network transmission control module (63), a document transmission control module (64), a system configuration and user management module (65) and a internet access transmission module (66).

The graphics terminal service module, together with graphics terminal network transmission module, provides graphics terminal service to its clients;

The internal network transmission control module is designed to strictly control network session, ensuring the validity of session between the clients within the network and the internet access server;

The document transmission control module is intended to manage the files and data transmission between any user computer's local disc and the user's private storage space on the internet access server;

The system configuration and user management module is used to add, delete or modify user setting, upload process design and system parameters setting;

The internet access transmission module is intended to provide transmission control management for the above mentioned graphics terminal service module to access internet.

The server herein is compatible with any operating system in Linux, Microsoft Window and Unix server.

Detailed Description of the Functional Modules is as Follows:

1) Graphics Terminal Service Module and Graphics Terminal Network Transmission Module Graphics terminal service module incorporates baseline www web explorer, E-mail and FTP client terminal. It can activate/call up www web explorer, E-mail and FTP as a tool for the clients to access internet. With development of the internet technology, these common tools can be extended flexibly.

The client-server model in the graphics terminal service module is built upon graphics terminal protocol instead of specified software or hardware. Graphics terminal protocol is an intangible application service protocol, incorporating input request from terminals and screen/media output directive issued to server applications, but not covering accessing and controlling the underlying hardware. The protocol is the channel through which the graphics terminal server program communicates with the graphics terminal client program. Specifically, it is through this channel that the graphics terminal client program sends requests to the graphics terminal server program, and that the graphics terminal server program provides information on status etc in return. In this process, what actually controls the terminal operations is the graphics terminal server program.

Besides, the graphics terminal protocol is based on a number of common transmit protocols, including such network protocols as TCP/IP, IPX/SPX and DECnet etc, through which the server and its clients can communicate conveniently.

Graphics terminal is a network-based image engine, which allows for processing I/O operations, including input, display and voice, while connecting to remote computer, operating on the server or using the CPU and hard disks of the remote server. What distinguishes accessing internet via internet access graphics terminal from accessing internet directly by common clients is that the web explorer and E-mail client terminal are actually operating on the server, which means the hard disk space ready to be used is the space on the server you have been authorized to use. The invention herein has no specification on graphics terminal protocol.

In other words, the graphics terminal protocol can be any of the standard graphics terminal protocols, such as VNC, RDP, ICA etc, or a self-defined protocol based on the graphics terminal philosophy. However, to describe the invention in further details, VNC protocol, a widely used graphics terminal protocol in the industry, is used here to illustrate how the graphics terminal server operates. (Note: VNC protocol is no part of the invention herein.)

VNC protocol is composed of VNC Server and VNC Client. The former generates local display, and the latter displays it on its own screen. VNC protocol is used between them. VNC server is the graphics terminal service module described herein.

VNC provides a simple protocol for remote control of image interfaces. Based on the level of Frame Buffer, it can be applied to all operating system platforms and applications. The protocol in terms of display is based on a simple theory: "to locate the pixels in a rectangular area to a specified position." By adopting different image encoding methods, a balance can be achieved among transmission speed, image quality, server processing speed, terminal display speed, and network bandwidth. The change of the image in these windows is known as Frame Buffer Update. Each update of the window provides the newest content in the window. In some way, it is more like a visual image flow. The window update message is sent to the server through clients, and the server will make response on receiving it, thus rendering the protocol a capability of controlling its own update speed.

Input protocol is based on the response message from the keyboard and mouse device of a standard working station. When received by the clients, these messages are simply sent to the server as events, thus generating responding actions.

Encoding methods in these protocols: VNC protocol supports a number of encoding methods, including Raw, Copy Rectangle, RRE, CoRRE, Hextile and ZRLE.

Take ZRLE for example, it refers to Zlib run-length encoding, combining Zlib compression, tiling, palletisation and run-length encoding. The data stream flowing via network is composed of Zlib compressed data of 4-byte length and equivalent length. Each Zlib data stream corresponds to a given VNC connection.

Zlib data not compressed is similar to Hextile encoding, divided into 64×64 tiles. Each tile contains a byte specifying the sub-encoding type. If the 7th bit of the byte reads 1, run-length encoding will be used; the other 7 bits indicate the size of the palette.

Such is about VNC protocol. For more details, go to www.realvnc.com.

Figure 7:
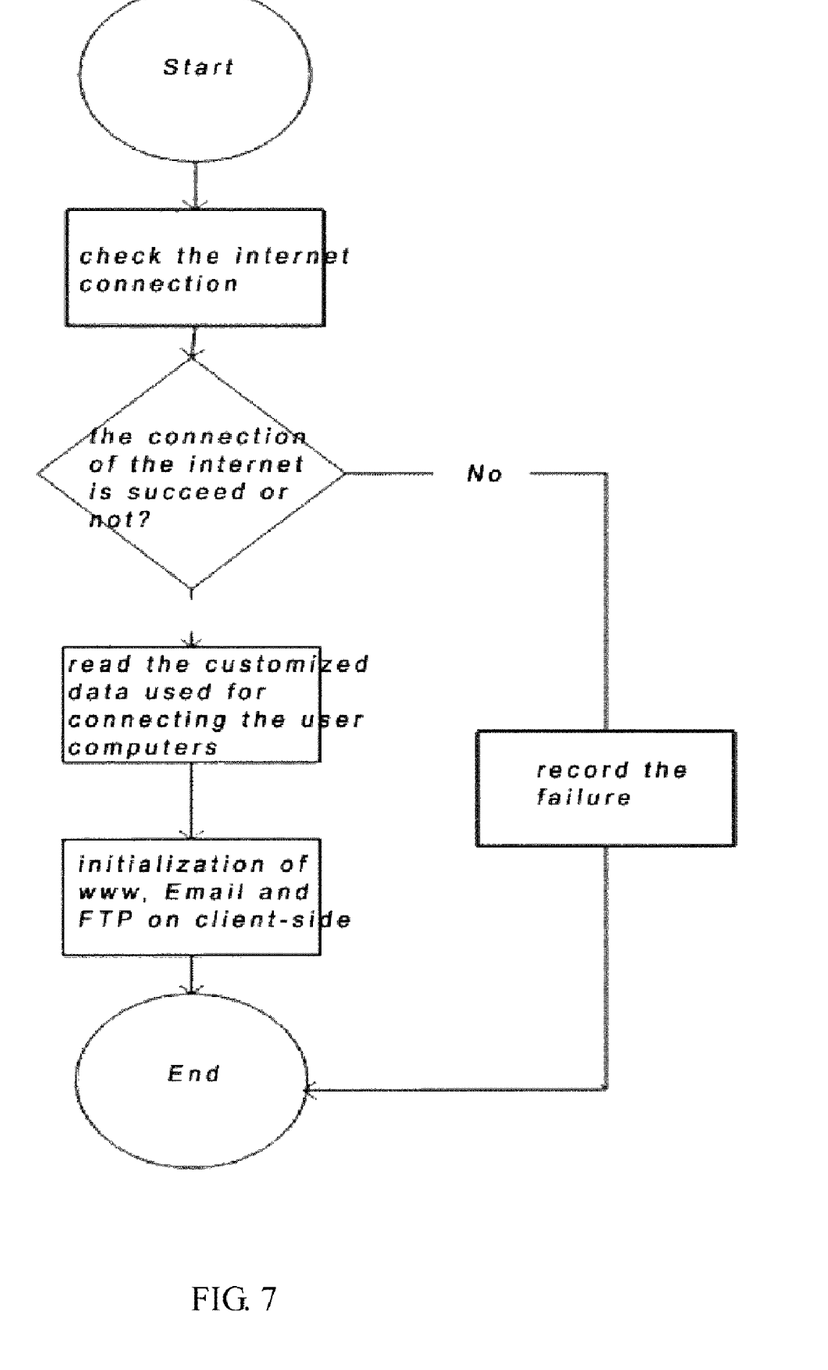
FIG. 7 is a flow chart of establishing an internet access by the graphics terminal service module defined in the invention herein.

The process of establishing an internet access connection for a server can be found in FIG. 7. Firstly, check if the server is in normal operation. If yes, read the customized configuration settings and data used for connecting the user computers prior to initialization of www explorer, E-mail and FTP on client-side. When initializing an internet connection, remember that users have their own personal settings, e.g. cookie (personal parameters) in internet access. These initialization settings are saved in their own private storage space separately, which needs to be referred to when access connection initialization is executed.

www web explorer functions on the basis of Html (Hyper Text Markup Language) display and browser components under HTTP protocol, E-mail client terminal is built upon the E-mail management tools under SMTP (Simple Mail Transfer Protocol) protocol, and FTP client terminal is based on an FTP graphical interface. All of them allow for being called up by a third party component, which are too many to be named. No details are to be given here on how the above three are implemented.

Graphics terminal network transmission module deals with compressing the output requests from computers within the network on the graphics terminal service layer, thus minimizing the bandwidth they occupy.

Access to internet in the invention herein is achieved through consolidating the miscellaneous transmit protocols between clients and the internet to the transmit protocol based on graphics terminal and protocols described hereafter between internet access server and the clients.

2) Internal Network Transmission Control Module

Internal network transmission control module is designed to ensure data transmission security by filtering data package on certain conditions.

Data package filtering is achieved by integrating the network data package filtering program in the protocol of inbound network interface. All the data packages will be screened by the inbound network transmission control layer before passing through the inbound network interface.

Only the valid data packages are allowed to pass.

Internal network transmission control module ensures that the data transmission between the internet access server and the clients is not beyond four kinds of data session, i.e. graphics terminal network protocol, valid download from the server onto its clients, strictly controlled upload from clients onto the internet access server, control instructions. Control instructions can be predefined by the system, e.g. screen alignment, audio control etc. Control gateway identifies data session of the other three kinds by the encrypted data identifier of the data package transmitted in the network, and therefore those data packages without appropriate identifiers will be discarded.

The mark of data package can be represented by the encrypted data translation on the physical address of the client network card and the session start-time that each data package must contain.

The session record logged on the inbound network transmission control layer is as follows:

| | |
|---|---|
| ClientMac | Client mac address |
| ClientIP | IP address |
| ServerMac | Server mac address |
| ServerIP | Server IP address |
| SessionMark | Session ID |
| Sessionstarttime | session start time |
| SessionLasttime | Start time of the latest session |
| Active | Active or not |

System will automatically update every two minutes. The session record that has nothing new within two minutes will be deactivated, and reactivation needs recertification.

Figure 4:
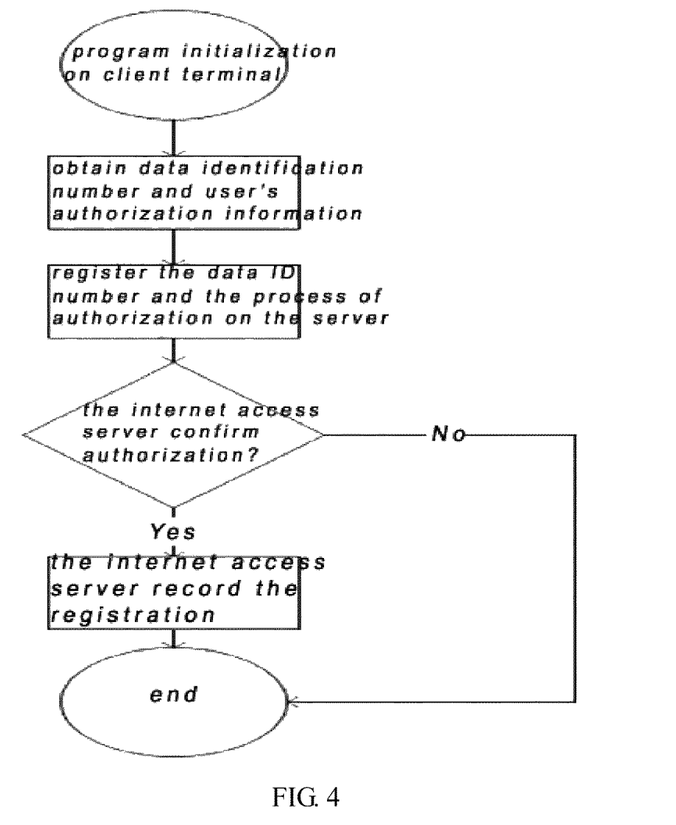
FIG. 4 is the flow chart of registration on client-side defined in the invention.
Figure 5:
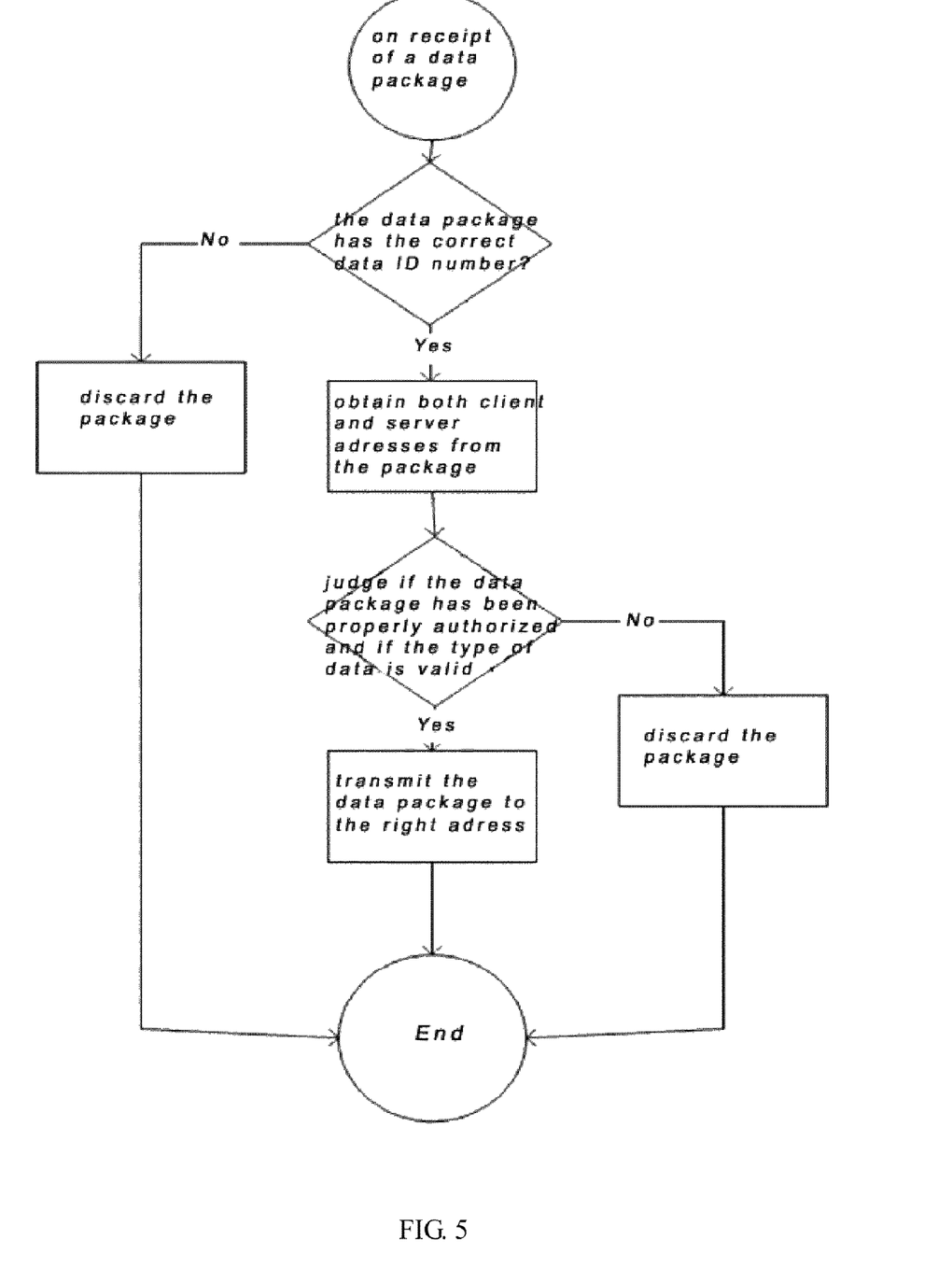
FIG. 5 is the flow chart of data package filtering done by the inbound data control module defined in the invention herein.

See FIG. 4 for detailed process of registration on client-side, and FIG. 5 for data filtering process.

See FIG. 4. Obtain data identification number and user's authorization information by program initialization on client terminal, register the data ID number on the internet access server and get authorization. The internet access server will record the registration and announce this registration finished after confirming the authorization, or directly announce registration finished if the authorization is not confirmed.

See FIG. 5. On receipt of a data package, tell if it has the correct data ID number;

As for those with correct data ID number, obtain both client and server addresses from the package, and judge if it has been properly authorized and if the type of data is valid; If yes, transmit the data package to the right address and announce termination of transmission; If no, discard the package;

For the data packages without correct data ID number, discard the data package directly and announce termination of transmission.

Therefore, clients shall register at the inbound network transmit control module and get certified by the internet access server before accessing the server and having their data package pass. However, if the client terminal is closed or inactive for a certain period of time, registration of this client will be deleted at the access control gateway. Re-accessing the server needs to register once again.

No registration, no access. It is the same case from clients to server and reversely. So session registration and encrypted data marking are key conditions for data packages to pass through.

3) Document Transmission Control Module

Besides graphics terminal protocol, data transmission channel for encrypted file transfer is allowed to exist between the internet access server and its clients. There are two parts, i.e. download and upload.

Figure 8:
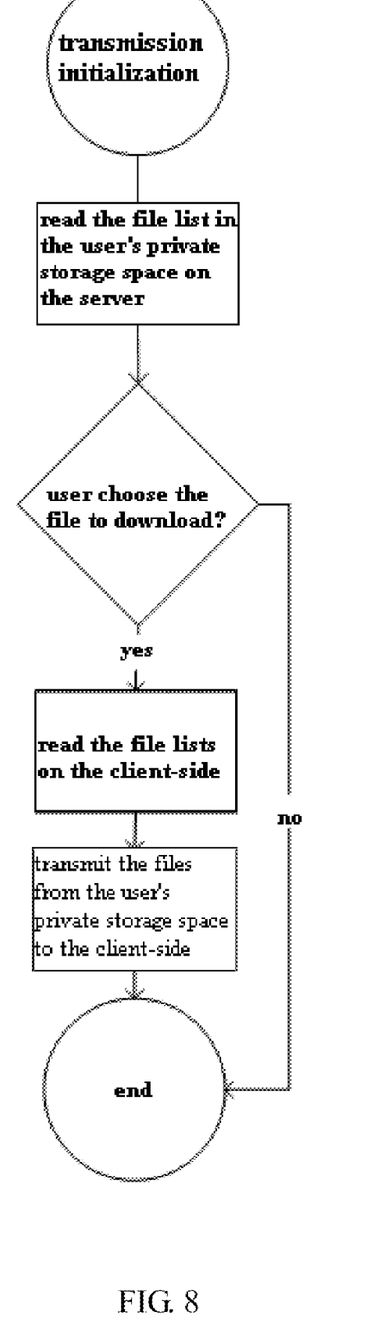
FIG. 8 is a flow chart of download control process carried out by the document transmission control module defined in the invention herein.

See FIG. 8 for detailed download control process. After users download files onto their private storage space via www web explorer at graphics terminal, or E-mail client terminal, or FTP client terminal, the file transfer module provides a list of all the files to the clients in accordance with the list of files on the specific space on the server after the download link initialization, from which users can choose to download;

Having read the target directory defined by the user, the transfer module transmits the data to the right local directory specified by the user in his/her computer on the internal network via authorized data transfer channels.

To download files from internet, users can follow such process: download the file from internet onto their own private storage space on the internet access server; document transmission control module then lists all the files in accordance with the list of files on their private storage space, from which users can choose to download; transmit the file(s) into the specified directory on their own computers within the internal network via an authorized data transmit channel.

Advanced users are privileged to controlled file upload.

Figure 6:
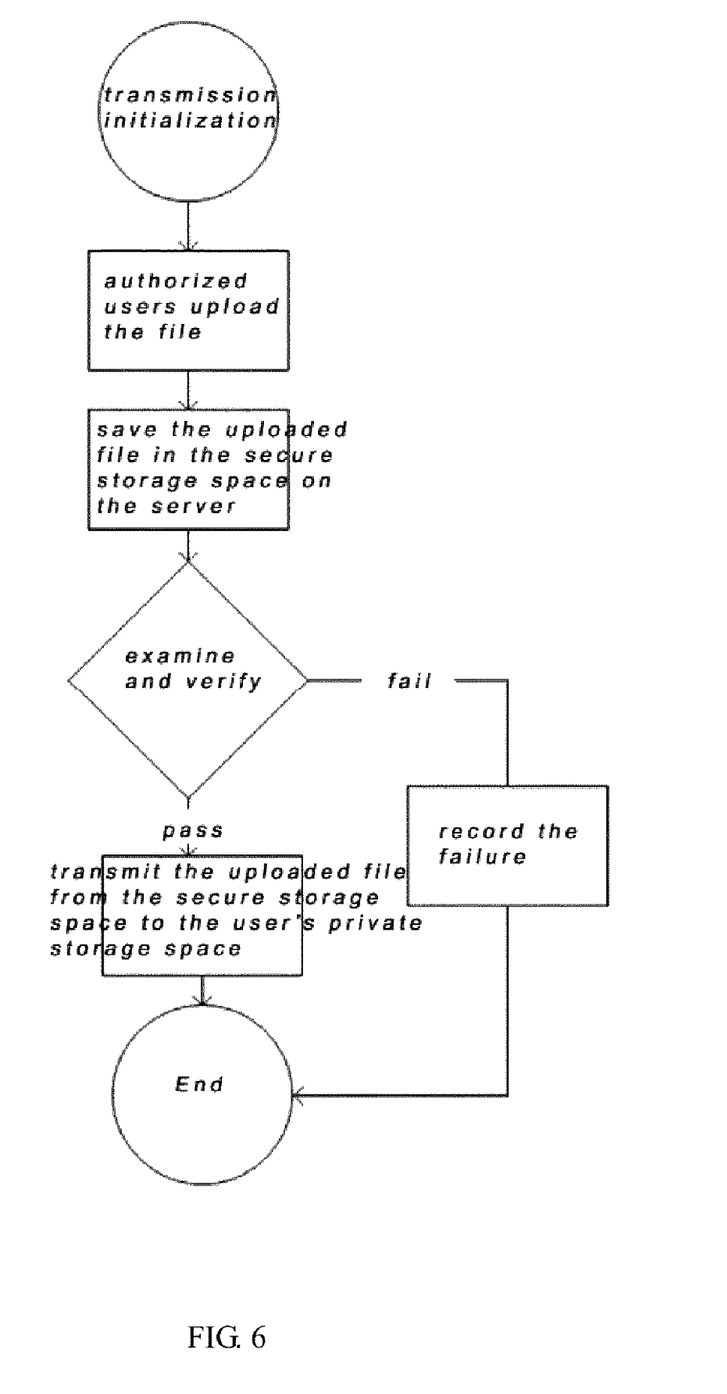
FIG. 6 is the specific flow chart of upload control process carried out by the file transfer module defined by the invention herein.

See FIG. 6 for detailed upload control process: advanced users upload the file via authorized encrypted data transmission channel; the file will be first saved in the secure storage space for screening; the file that passes the screening will be then saved in the user's private storage space on the server; finally, the user will actually upload the file when accessing internet via graphics terminal service module. In the process of download and upload, the personal storage space that the server allocates to the users functions as a buffer between the computers within the internal network and the outside internet.

4) System Configuration and User Management Module

The key of the module lies in user management, which manages users that access internet, adding, deleting and modifying users and specifying the storage space and its size for them.

The core users' information is as follows:

| | |
|---|---|
| Username | User's name |
| Password | User's password |
| SpacePath | Path of user's private storage space |
| SpaceSize | Size of user's private storage space |
| DownloadEnable | Download or not |
| UploadEnable | Upload or not |
| Disable | User is active or not |

5) Internet Access and Transmission Module

In this system herein, internet access and transmission is actually achieved by providing internet access and transmission service for the graphics terminal service module, which is beyond the coverage of the claims herein and therefore no details are given on it.

The sub-modules in this invention, such as internal network transmission control module and graphics terminal service module etc. can be implemented in different servers. For example, the inbound network transmission control can be implemented on Server A, and the graphics terminal service on Server B; thus clients must first sends the data package to A, which will reroute the package to B after verifying it. The implementation theory and effect remains the same. Implementation of modules on different servers is a variety adopted by the service system herein.

Desired Outcome:

With a system of this architecture being implemented in enterprises and agencies, users can conveniently access the remote internet access server using dedicated client terminals. User's client terminal is a remote graphics terminal to the server. Each user has a private storage space for downloaded files, from which users can transmit the file(s) into their office computers, whereas file upload is strictly controlled.

After the invention is put into practice, most of the agencies that require physical isolation of internal and external networks will enjoy the convenience of internet with information security ensured at the same time. It makes it possible to prevent unintentional information leakage, and provides for an effective measure against virus and Trojan.

Though the invention is described with examples in current practice, it shall be understood by any common technician in this industry that the examples herein are only for the purpose of describing the invention, and therefore are allowed to be changed and modified in a way that achieves equivalent performance and in the spirit of the invention. Thus, any change or modification made in the spirit of the invention will fall within the scope of the claims herein.

The invention claimed is:

1. An internet access server system having hardware and software components comprising:

a local area network;

a plurality of user computers, are installed on the local area network;

an Internet access server also installed on the local area network which is an internal network, wherein the Internet access server is a computer that comprises a CPU and memory;

wherein the Internet access server isolates the internal network from an external network, wherein the Internet access server is connected to the internal network comprising a network of user computers and wherein the Internet access server is connected to an internet, wherein the Internet access server isolates the user computers from the internet, wherein the Internet access server is built upon an ontology server, wherein the internet access server further comprises:

a graphics terminal service module, a graphics terminal network transmission module, an internal network transmission control module, a document transmission control module, a system configuration and user management module, and an internet access transmission module;

wherein the graphics terminal service module is connected to the graphics terminal network transmission module, providing graphics terminal service to its clients;

wherein the internal network transmission control module which is connected to the above mentioned ontology server strictly controls network session, ensuring the validity of session between the clients within the network and the internet access server;

wherein the document transmission control module which is connected to the ontology server is intended to manage the files and data transmission between any user computer's local disc and the user's private storage space on the internet access server;

wherein the system configuration and user management module which is connected to the ontology server is used to add, delete or modify user setting, upload process design and set system parameters;

the internet access transmission module which is connected to the ontology server is intended to provide transmission control management for the above mentioned graphics terminal service module to access internet;

the internet access server further comprises two network interfaces including an internal network card connected to the local area network and an external network card connected to the Internet, wherein the internal network card allows user computers to access internet graphics terminals, and wherein the external network card allows user computers to access internet via the Internet access server which authorizes user computers to access Internet and provides user computers with Internet applications, wherein the user computers are configured so they do not have direct access to the Internet.

2. The internet access server for isolating the internal network from the external network according to claim 1, wherein the said graphics terminal service module includes a www web explorer, E-mail client terminal and FTP client terminal.

3. The internet access server for isolating the internal network from the external network according to claim 1, wherein the data transmission controlled by the internal network transmission control module between the clients and the internet server has four types of data session, including graphics terminal network protocol, valid download from the server onto its clients, controlled upload from clients onto the internet access server, control instructions.

4. The internet access server for isolating the internal network from the external network according to claim 1, wherein the said document transmission control module is composed of download component and upload component.

5. An internet access server for isolating the internal network from the external network according to in claim 1, wherein the said internal network transmission control module, the graphics terminal service module, the document transmission control module, the system configuration and user management module, and the internet access transmission module are set in different ontology servers in a predetermined manner.

* * * * *